United States Patent [19]

Pedersen

[11] Patent Number: 4,916,851
[45] Date of Patent: Apr. 17, 1990

[54] PASSIVELY ANCHORED FISHING TACKLE

[75] Inventor: Didrik Pedersen, Kjøllefjord, Norway

[73] Assignee: Alternativt Fiskeredskap AS, Kjollefjord, Norway

[21] Appl. No.: 348,537

[22] Filed: May 8, 1989

[30] Foreign Application Priority Data

May 16, 1988 [NO] Norway .................................. 882132

[51] Int. Cl.⁴ ............................................. A01K 69/10
[52] U.S. Cl. ..................................................... 43/101
[58] Field of Search .......................... 43/101, 105, 103

[56] References Cited

U.S. PATENT DOCUMENTS

| 675,045 | 5/1901 | Kittredge | 43/103 |
| 1,088,222 | 2/1914 | Hall | 43/103 |
| 1,157,417 | 10/1915 | Paine | 43/103 |

FOREIGN PATENT DOCUMENTS 42897  8/1970  Finland .................................. 43/101

Primary Examiner—M. Jordan
Attorney, Agent, or Firm—Pollock, Vande Sande & Priddy

[57] ABSTRACT

A passively anchored fishing tackle of the net kind comprises bottom nets, top nets, lateral nets, inlet nets, and lead-in nets which cooperate to form a catching space. Lateral nets, inlet nets and lead-in nets are provided with top lines with an incorporated buoyancy, and bottom sink lines. All nets of the inlet portion are square-meshed, whereas the rest is normally meshed. From both sides of the lead-in net inlet nets extend.

3 Claims, 2 Drawing Sheets

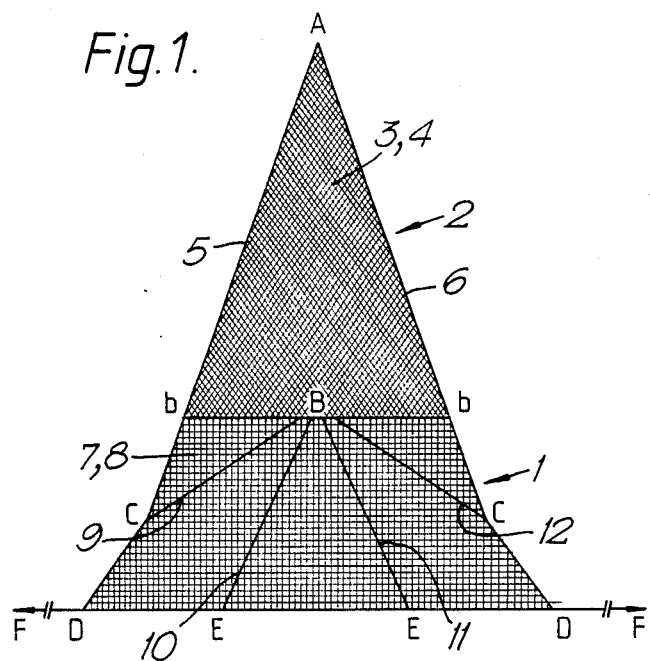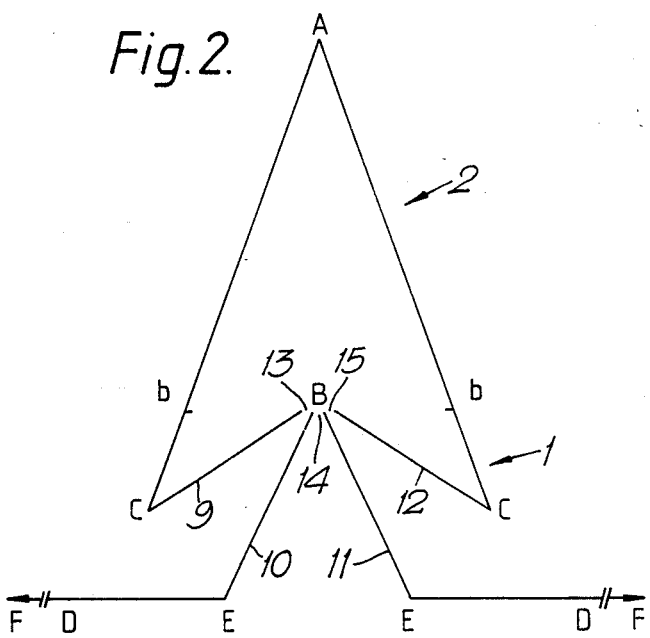

PASSIVELY ANCHORED FISHING TACKLE

BACKGROUND OF THE INVENTION

Field of the Invention

The present invention relates to a passively anchored fishing tackle of the net kind, comprising a bottom net, a top net, lateral nets, an inlet net, and a lead-in net, which nets cooperate to form a catching space.

Such known passively anchored fishing tackle was previously based on use of a framework or supporting structure to achieve required spreading at top and bottom levels. On the surface floats are often used as well.

It is also known to make fast trawling equipment for use as stationary tackle. In such cases stiffening means are also used, e.g. by utilization of yokes or otter boards/trawl doors.

The kown stationary tackle is only intended for fishing in one direction, and is primarily based on use in canal/river systems, as well as in shallow waters.

SUMMARY OF THE INVENTION

It is an object of the present invention to provide a passively anchored fishing tackle, where no framework or stiffening structure, yokes or doors are used. It is another object of the invention to permit two-way fishing with such a passively anchored fishing tackle.

Framework, stiffening structures, and the like are bulky means, and transport, deployment, and anchoring of fishing tackle with such means is, obviously, complicated and time consuming. The new fishing tackle according to the invention may be transported and anchored in a relatively simple manner, even in deep waters.

According to the invention a passively anchored fishing tackle is characterized by the fact that lateral nets, inlet net, and lead-in nets are provided with top lines with inherent buoyancy, and bottom sink lines, and that all nets of the inlet portion are square-meshed, whereas the remaining nets are normally meshed.

By such a design of the finshing tackle it is achieved that nets in inlet and lead-in walls, as well as nests of the top and bottom of the introductory portion will be flat and tensioned. Use of square-meshed nets contributes to stability. Use of normal nets provides the possibility of increasing and decreasing through-flow of water, with associated higher stability of the square-meshed nets. The top line with incorporated buoyancy, for example cork or other buoyancy inserts, is intended for providing buoyancy in the net walls. Bottom sink lines, for example with lead or other sink inserts, are made so heavy that the top lines will not lift the tackle from the sea floor or from a desired level in the sea.

In order to keep the fishing tackle open, lead in nets are anchored at their free ends, and this may, advantageously, be achieved by anchoring the sink line of the lead in line at its free end, with the top line guided down to the sink line.

According to the invention inlet nets may, advantageously, be provided on both sides of lead in net. In this manner two-way fishing is achieved.

The lead-in nets for two or more fishing tackel means may if required be combined, so that a desired number of fishing tackle means may be serially connected.

BRIEF DESCRIPTION OF THE DRAWINGS

The invention will be disclosed in more detail with reference to the drawings, wherein FIG. 1 is a top view of the new fishing tackle, FIG. 2 shows the extension of the vertical nets of the fishing tackle.

DETAILED DESCRIPTION OF THE DRAWINGS

Figure 3:
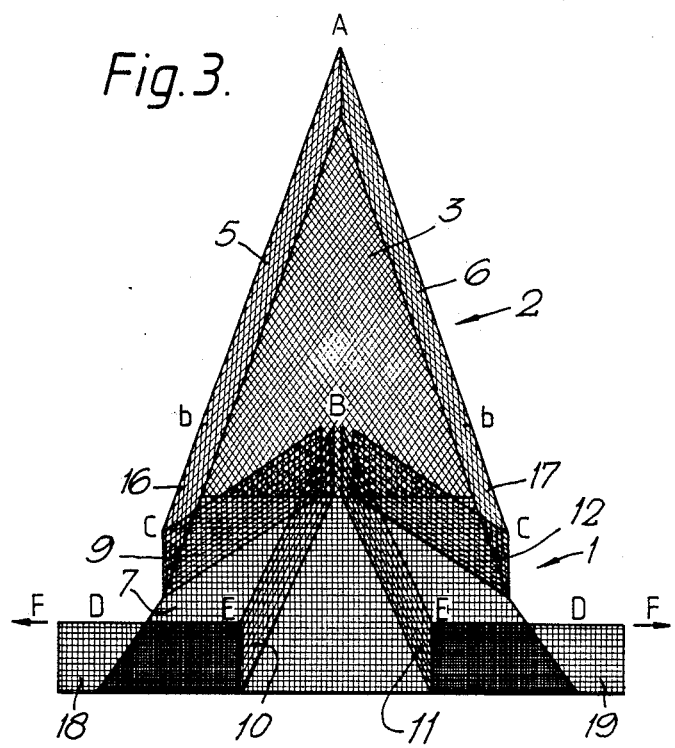
FIG. 3 shows the bottom and vertical nets in an isometric view, where the top net is omitted for clarity.

It will appear from the top view in FIG. 1 how the nets are designed on top and bottom of the fishing tackle (top net and bottom net are identical). The fishing tackle has an inlet portion and a portion2 constituting the catching space. The inlet portion is limited as shown by points F, D, C, b, B, b, C, D, F (also see FIGS. 2 and 3). Catching space 2 is limited by points b, A, and b.

The structure of the fishing tackle is described in more detail below. It will appear from FIGS. 1 and 3 that catching space 2 consists of a bottom net 3, limited by points b,A, B, and a corresponding top net 4. Furthermore, catching space 2 consists of a lateral net 5 (b, A), and a lateral net 6 (A,b). As shown, nets 3, 4, 5, and 6 have normal meshes.

Inlet portion 1 is designed with a bottom net 7 (D, C, b, b, C, D), and a corresponding top net 8. In inlet portion 1 bottom net 7 and tp net 8 are made square-meshed.

In inlet portion 1, there are also four vertical inlet nets 9, 10, 11, and 12. The inlet nets form three inlets at point B, such as inlets 13, 14, and 15. All four inlet walls 9-12 are square-meshed.

From respective points b-C vertical nets 5, and 6 are extended by square-meshed nets 16, and 17, respectively (B, C).

A lead-in net 18 (F,E) extends from inlet net 10, and a corresponding lead-in net 19 extends from inlet net 11. In areas D,F, and E,D, respectively, lead-in nets 18, and 19, respectively, at the same time act as inletnets. The lead-in nets are also square-meshed.

All vertical nets are provided with respective top lines with cork or other buoyancy inserts, as well as sink lines with lead/or other sink inserts. In the preferred embodiment the top lines and sink lines are provided in that sinker means secured by sewing to the bottom of net 1 from A to F, and b to b, also from C to B, from B to E and from D to D. Floating lines are provided by sewing in the same manner on top of the net.

Figure 4:
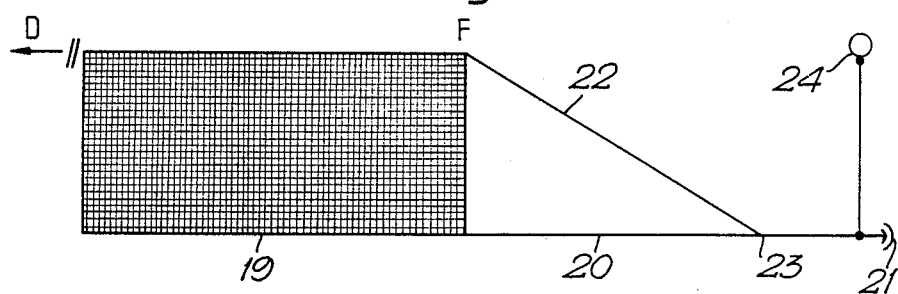
FIG. 4 shows a portion of a lead in net with its associated anchoring.

In FIG. 4 a possible anchoring of a lead-in net 19 is shown. its sink line 20 is extended outwards, to a graphnel 21. The top line is extended from F downwards, as shown at 22, and is connected with bottom line 20 at 23. A marker buoy is indicated at 24.

It will appear from the above mentioned that the new fishing tackle is designed without any framework or stiffening structure, and the like. It is, thus, possible to stow the tackle on board in a manner that only requires relatively small space. Deployment is also simplified, because the tackle may be deployed by using common techniques for setting out nets. The same is true for hauling the tackle aboard. The square-meshed nets used in the inlet portion provide good and sufficient stability for the fishing tackle. The result is a flat and tensioned net in lead-in net and inlet walls, and in the top and bottom portions of the inlet portion. Anchoring of lead-in nets at both ends will keep the structure open laterally, whereas the used top and bottom lines provide desired stable spreading and hold in the vertical direction. Those skilled in the art will also understand from the above that by connecting lead-in nets it is possible to connect a desired number of the shown fishing tackle in a series arrangement.

I claim:

1. A passively anchored fishing tackle of the net kind, including bottom nets, top nets, lateral nets, inlet nets and lead-in nets, which cooperate to form a catching space, wherein the lateral nets, inlet nets, and lead-in nets are provided with top lines having incorporated buoyancy, and bottom sink lines and wherein all nets are square-meshed in the inlet portion whereas the rest are normally meshed.

2. A passively anchored fishing tackle according to claim 1, wherein the inlet nets form both sides of lead-in nets.

3. A passively anchored fishing tackle according to claim 1, wherein the sink line of the lead-in net is anchored at its free end, with top line extended down to bottom line.

* * * * *